(12) United States Patent
Bandic et al.

(10) Patent No.: US 6,967,808 B1
(45) Date of Patent: Nov. 22, 2005

(54) DATA RECORDING SYSTEM WITH SERVO PATTERN HAVING PSEUDO-RANDOM BINARY SEQUENCES

(75) Inventors: Zvonimir Z. Bandic, San Jose, CA (US); Richard M. H. New, San Jose, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 24 days.

(21) Appl. No.: 10/845,814

(22) Filed: May 13, 2004

(51) Int. Cl.[7] ............................ G11B 5/596; G11B 5/09
(52) U.S. Cl. ..................................... 360/77.08; 360/48
(58) Field of Search ...................... 360/75, 48, 77.08, 360/77.02, 78.04

(56) References Cited

U.S. PATENT DOCUMENTS 4,823,212 A * 4/1989 Knowles et al. .......... 360/77.08

OTHER PUBLICATIONS

MacWilliams and Sloane, Proceedings of the IEEE, vol. 64, No. 12, pp 1715-1729.

* cited by examiner

Primary Examiner—Andrew L. Sniezek
(74) Attorney, Agent, or Firm—Thomas R. Berthold

(57) ABSTRACT

A data recording system, such as a magnetic recording hard disk drive, has a recording medium in which the data tracks have pseudo-random binary sequences for the servo information used to control the position of the recording head. A first pseudo-random binary sequence (PRBS) and a second PRBS identical to the first PRBS but shifted by a portion of the period of the first PRBS are located between the track boundaries in alternating tracks in a first region of the servo pattern and between the track centers in alternating tracks in a second region spaced along the track from said first region. A servo decoder has two correlators, one for each PRBS. Each correlator outputs a dipulse when its PRBS repeats. The difference in amplitude of the dipulses represents the head position signal. The dipulses also control the amplifier for the signal read back by the head and the timing of the track identification (TID) detector.

12 Claims, 12 Drawing Sheets

DATA RECORDING SYSTEM WITH SERVO PATTERN HAVING PSEUDO-RANDOM BINARY SEQUENCES

RELATED APPLICATION

This application is related to concurrently filed application Ser. No. 10/845,813 titled DATA RECORDING MEDIUM WITH SERVO PATTERN HAVING PSEUDO-RANDOM BINARY SEQUENCES. Both applications are based on a common specification, with this application having claims directed to a data recording system and having claims directed to a data recording medium.

TECHNICAL FIELD

This invention relates generally to data recording systems, such as magnetic recording hard disk drives, and more particularly to pre-recorded servo patterns and servo positioning systems to locate and maintain the read/write heads on the data tracks.

BACKGROUND OF THE INVENTION

Magnetic recording hard disk drives use a servo-mechanical positioning system to hold the read/write head on the desired data track and to seek from track to track as required to perform read and write operations. Special "servo" information is written in fields in circumferentially-spaced servo sectors in each of the concentric data tracks on each disk surface. The servo pattern is constructed across multiple tracks so that the read-back signal from the head, as it passes over the pattern, can be decoded to yield the radial position of the head. The servo pattern is written onto the disk during manufacturing in a process known as servowriting.

In conventional servowriting the servo pattern is written in multiple passes using the regular write head in conjunction with a specialized servowriter. The servo pattern may also be written using a magnetically printed preliminary pattern followed by a detailed final pattern, by a media-level servowriter (e.g., a stack of 10 disks servowritten with servowriting heads), or by self-servowriting by the disk drive without a specialized servowriter. Each servowriting pass must be precisely aligned circumferentially. Misalignment introduces errors into the servo system. As the density of the tracks in the radial direction and the linear density of the data bits in the circumferential or along-track direction increase it becomes increasingly difficult to precisely align the servo fields circumferentially.

What is needed is a magnetic recording disk having a servo pattern, and a disk drive having a servo decoding system, that are not sensitive to misalignment of the pre-recorded servo fields.

SUMMARY OF THE INVENTION

The invention is a data recording system that uses a medium in which the data tracks have servo sectors that include pseudo-random binary sequences for the servo positioning information. A first pseudo-random binary sequence (PRBS) and a second PRBS identical to the first PRBS but shifted by a portion of the period of the first PRBS are located between the track boundaries in alternating tracks in a first region of the servo pattern and between the track centers in alternating tracks in a second region spaced along the track from said first region. The servo pattern also includes two track identification (TID) fields for each track with one of the TID fields being located between the first and second regions of the servo pattern.

In a magnetic recording disk drive implementation of the invention, the disk drive includes a variable gain amplifier that amplifies the recorded signal read by the head, a TID detector, an actuator that moves the head to the desired track and maintains it on the desired track, and a servo position information decoder that receives the first PRBS and second PRBS read by the head when the servo pattern passes beneath the head. The decoder includes a first correlator for the first PRBS and a second correlator for the second PRBS. Each correlator is matched to a single period of its associated PRBS and outputs a single dipulse each time its associated PRBS repeats. The difference in amplitude of the dipulses from the two correlators represents the head position signal sent by the decoder to the disk drive actuator. The correlator dipulse having the larger amplitude controls the variable gain amplifier and the timing of the TID detector.

For a fuller understanding of the nature and advantages of the present invention, reference should be made to the following detailed description taken together with the accompanying figures.

DETAILED DESCRIPTION OF THE INVENTION

Description of the Prior Art

Figure 1:
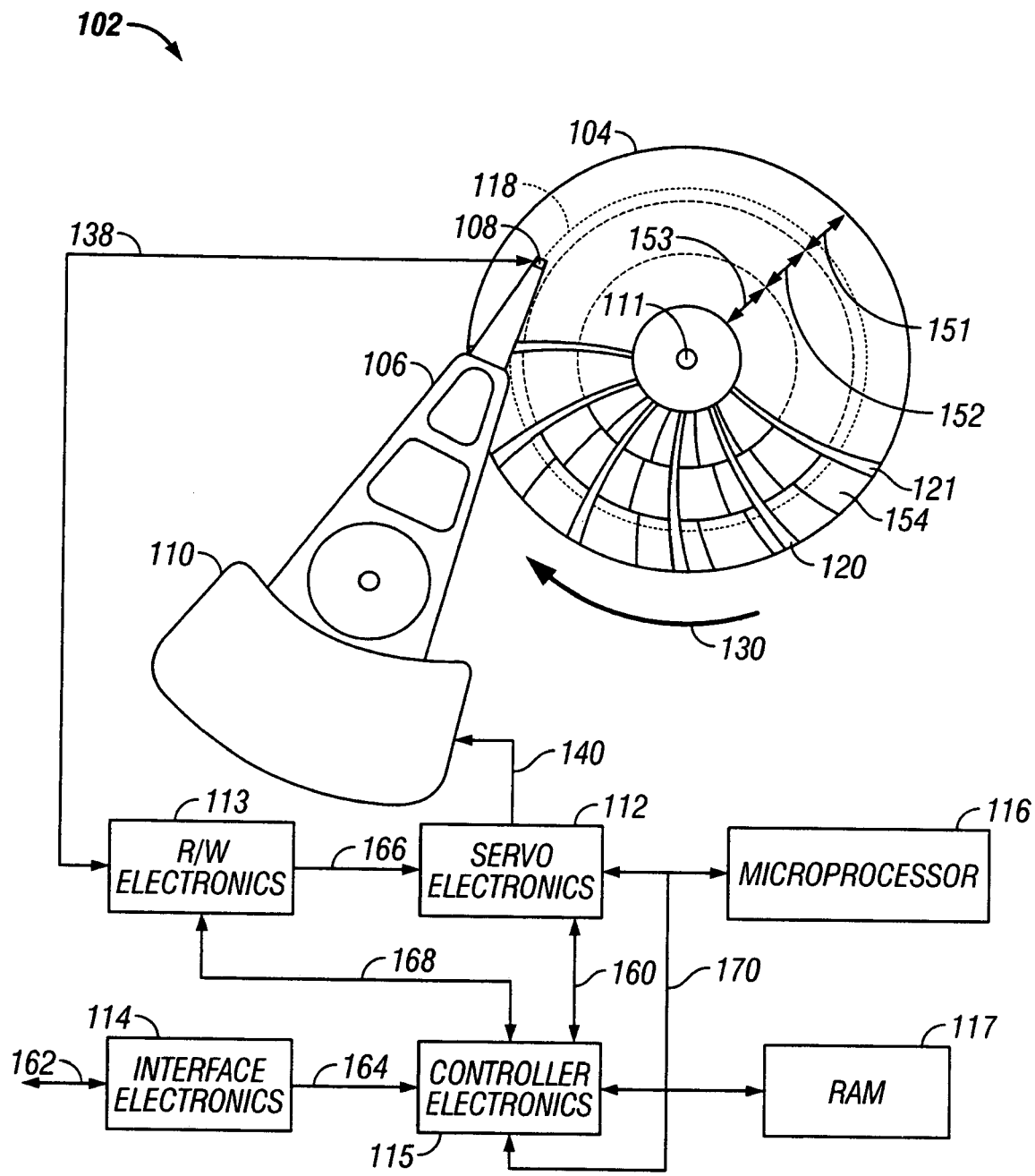
FIG. 1 is a block diagram of a prior art disk drive of the type usable with the present invention.

FIG. 1 is a block diagram of a disk drive of the type usable with the present invention. The disk drive depicted is one that is formatted using a fixed-block "headerless" architecture with sector servo and zone-bit recording (ZBR).

The disk drive, designated generally as 102, includes data recording disk 104, actuator arm 106, data recording transducer 108 (also called a head, recording head or read/write head), voice coil motor 110, servo electronics 112, read/ write electronics 113, interface electronics 114, controller electronics 115, microprocessor 116, and RAM 117. The recording head 108 may be an inductive read/write head or a combination of an inductive write head with a magnetoresistive read head. Typically, there are multiple disks stacked on a hub that is rotated by a disk motor, with a separate recording head associated with each surface of each disk. Data recording disk 104 has a center of rotation 111 and is rotated in direction 130. Disk 104 is divided for head positioning purposes into a set of radially-spaced concentric tracks, one of which is shown as track 118. The tracks are grouped radially into a number of zones, three of which are shown as zones 151, 152 and 153. Each track includes a plurality of circumferentially or angularly-spaced servo sectors. The servo sectors in each track are aligned circumferentially with the servo sectors in the other tracks so that they extend across the tracks in a generally radial direction, as represented by radially-directed servo sections 120. Each track has a reference index 121 indicating the start of track. Within each zone, the tracks are also circumferentially divided into a number of data sectors 154 where user data is stored. In this example the data sectors contain no data sector identification (ID) fields for uniquely identifying the data sectors so the drive is considered to have a "No-ID"™ type of data architecture, also called a "headerless" data architecture. If the disk drive has multiple heads, then the set of tracks which are at the same radius on all disk data surfaces is referred to as a "cylinder".

Read/write electronics 113 receives signals from head 108, passes servo information from the servo sectors to servo electronics 112, and passes data signals to controller electronics 115. Servo electronics 112 uses the servo information to produce a current at 140 which drives voice coil motor 110 to position head 108. Interface electronics 114 communicates with a host system (not shown) over interface 162, passing data and command information. Interface electronics 114 also communicates with controller electronics 115 over interface 164. Microprocessor 116 communicates with the various other disk drive electronics over interface 170.

In the operation of disk drive 102, interface electronics 114 receives a request for reading from or writing to data sectors 154 over interface 162. Controller electronics 115 receives a list of requested data sectors from interface electronics 114 and converts them into zone, cylinder, head, and data sector numbers which uniquely identify the location of the desired data sectors. The head and cylinder information are passed to servo electronics 112, which positions head 108 over the appropriate data sector on the appropriate cylinder. If the cylinder number provided to servo electronics 112 is not the same as the cylinder number over which head 108 is presently positioned, servo electronics 112 first executes a seek operation to reposition head 108 over the appropriate cylinder.

Once servo electronics 112 has positioned head 108 over the appropriate cylinder, servo electronics 112 begins executing sector computations to locate and identify the desired data sector. As servo sectors pass under head 108, the headerless architecture technique identifies each servo sector. In brief, a servo timing mark (STM) is used to locate servo sectors, and a count of STMs from a servo sector containing an index mark 121 uniquely identifies each servo sector. If the disk drive uses the older architecture with headers, then every sector is marked with a field containing a servo sector number which is read by the servo electronics and used to uniquely identify each servo sector. Additional information is maintained in association with servo electronics 112 and controller electronics 115 for controlling the reading or writing of data in the data sectors.

Figure 2A:
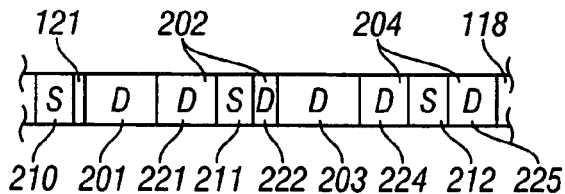
FIG. 2A is a portion of a typical data track on the disk of the disk drive shown in FIG. 1.

Referring now to FIG. 2A, a portion of a typical track 118 on the disk 104 is shown expanded. Four complete data sectors are shown (201, 202, 203 and 204). Three representative servo sectors 210, 211, and 212 are also shown. As can be seen from this example, some data sectors are split by servo sectors, and some data sectors do not start immediately following a servo sector. For example, data sectors 202 and 204 are split by servo sectors 211 and 212, respectively. Data sector 202 is split into data sections 221 and 222, and data sector 204 is split into data sections 224 and 225. Data sector 203 starts immediately after the end of data sector 202, rather than immediately following a servo sector. The index mark 121 indicates the beginning of the track and is shown contained in servo sector 210.

Figure 2B:
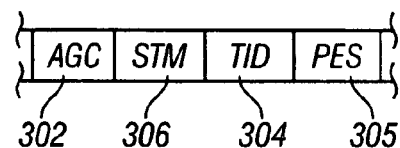
FIG. 2B is an expanded view of one of the servo sectors in the data track of FIG. 2A.

FIG. 2B is an expanded view of one of the servo sectors illustrated in FIG. 2A. Typically, each servo sector contains an STM 306. The STM 306 serves as a timing reference for reading the subsequent servo information in track identification (TID) field 304 and position error signal (PES) field 305. The STM is sometimes also referred to as a servo address mark, servo identification (SID), or servo start mark. Each servo sector also contains an automatic gain control (AGC) field 302 for controlling a variable gain amplifier (VGA) that adjusts the strength of the signal read by head 108.

Figure 3:
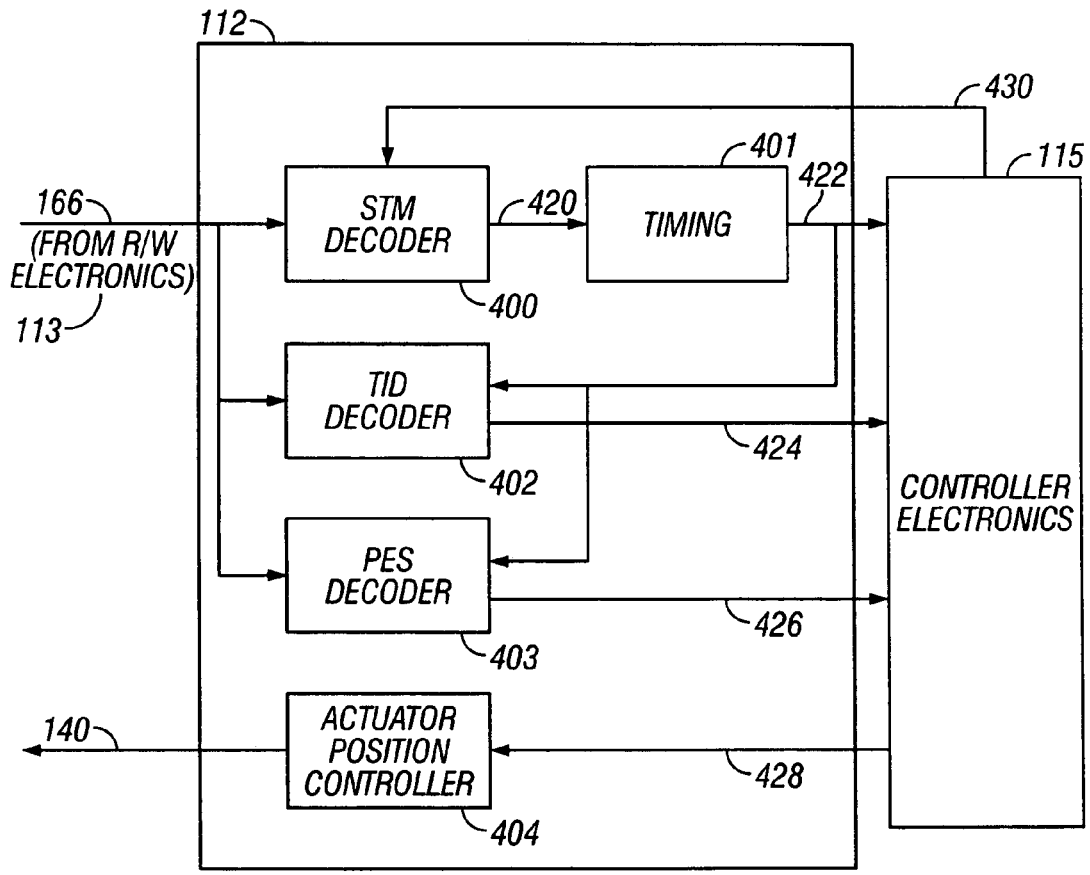
FIG. 3 is a block diagram of the servo electronics in the prior art disk drive in FIG. 1.

FIG. 3 is a block diagram of the servo electronics 112. In operation, controller electronics 115 provides input to actuator position control 404, which in turn provides a signal 140 to the actuator to position the head. The controller electronics 115 uses the servo information read from the servo sectors to determine the input 428 to the actuator position control 404. The servo information is read by the read/write electronics 113 (FIG. 1), and signals 166 are input to the servo electronics 112. STM decoder 400 receives a clocked data stream 166 as input from the read/write electronics 113, and a control input 430 from the controller electronics 115. Once an STM has been detected, an STM found signal 420 is generated. The STM found signal 420 is used to adjust timing circuit 401, which controls the operating sequence for the remainder of the servo sector.

After detection of an STM, the track identification (TID) decoder 402 receives timing information 422 from timing circuit 401, reads the clocked data stream 166, which is typically Gray-code encoded, and then passes the decoded TID information 424 to controller electronics 115. Subsequently, PES decode circuit 403 captures the PES signal from read/write electronics 166, then passes position information 426 to controller electronics 115. Inputs to the PES decode circuit 403 are typically analog, although they may be digital or of any other type. The PES decode circuit 403 need not reside within the servo electronics module 112.

Figure 4A:
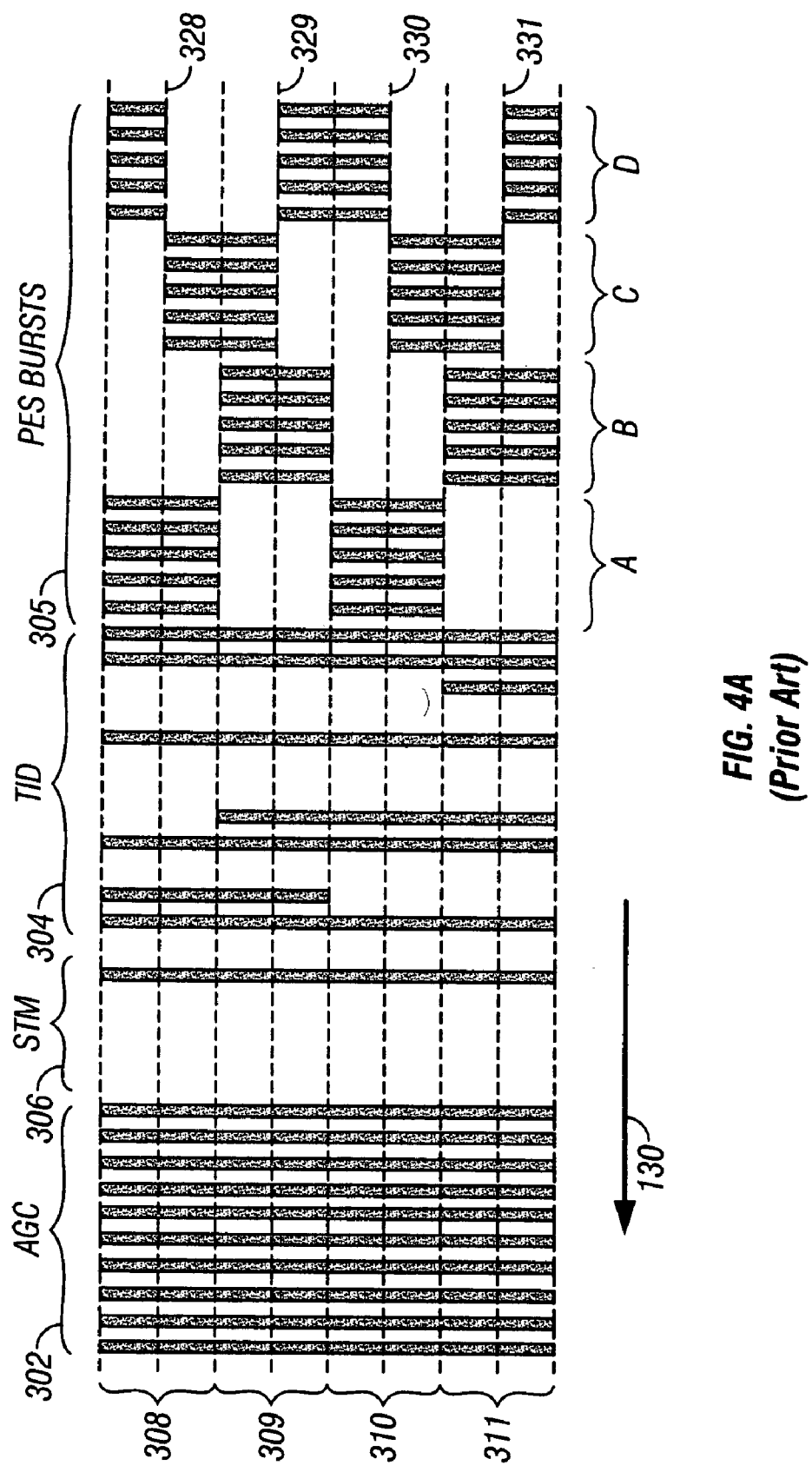
FIG. 4A is a prior art servo pattern with a quad-burst PES pattern.

FIG. 4A is a schematic of a conventional servo pattern of the type commonly used in sector servo systems and shows a greatly simplified pattern for clarity with only four tracks (tracks 308, 309, 310 and 311 having track centerlines 328, 329, 330 and 331, respectively). The servo pattern moves relative to head 108 in the direction shown by arrow 130. The two possible magnetic states of the medium are indicated as black and white regions. FIG. 4A shows the servo pattern in only four radially-adjacent servo sectors in one servo section 120 of the disk, but the pattern extends radially through all the data tracks in each servo section 120.

The servo pattern is comprised of four distinct fields: AGC field 302, STM field 306, Track ID field 304 and PES field 305. The servo positioning information in PES field 305 is a conventional quad-burst pattern comprising bursts A–D. The automatic gain control (AGC) field 302 is a regular series of transitions and is nominally the same at all radial positions. The AGC field 302 allows the servo controller to calibrate timing and gain parameters for later fields. The STM field 306 is the same at all radial positions. The STM pattern is chosen such that it does not occur elsewhere in the servo pattern and does not occur in the data records. The STM is used to locate the end of the AGC field and to help locate the servo pattern when the disk drive is initialized. The TID field 304 contains the track number, usually Gray-coded and written as the presence or absence of recorded dibits. The TID field 304 determines the integer part of the radial position. The position error signal (PES) bursts A–D are used to determine the fractional part of the radial position. Each PES burst comprises a series of regularly spaced magnetic transitions, the transitions being represented by the transitions between the black and white regions in FIG. 4A. The PES bursts are arranged radially such that a burst of transitions are one track wide and two tracks apart, from centerline to centerline. PES bursts are offset from their neighbors such that when the head is centered over an even-numbered track (e.g., track 310 with centerline 330) the read-back signal from burst A is maximized, the read-back signal from burst B is minimized and the read-back signal from bursts C and D are equal. As the head moves off-track in one direction (downwards in FIG. 4A) the read-back signal from burst C increases and the read-back signal from burst D decreases until, with the head half-way between tracks the read-back signal from burst C is maximized, read-back signal from burst D is minimized and read-back signals from bursts A and B are equal. As the head continues to move in the same direction the read-back signal from burst B increases and the read-back signal from burst A decreases until, with the head centered over the next track (with an odd track number, e.g. track 311 with centerline 331) the read-back signal from burst B is maximized, the read-back signal from burst A is minimized and the read-back from signals from bursts C and D are again equal.

Figure 4B:
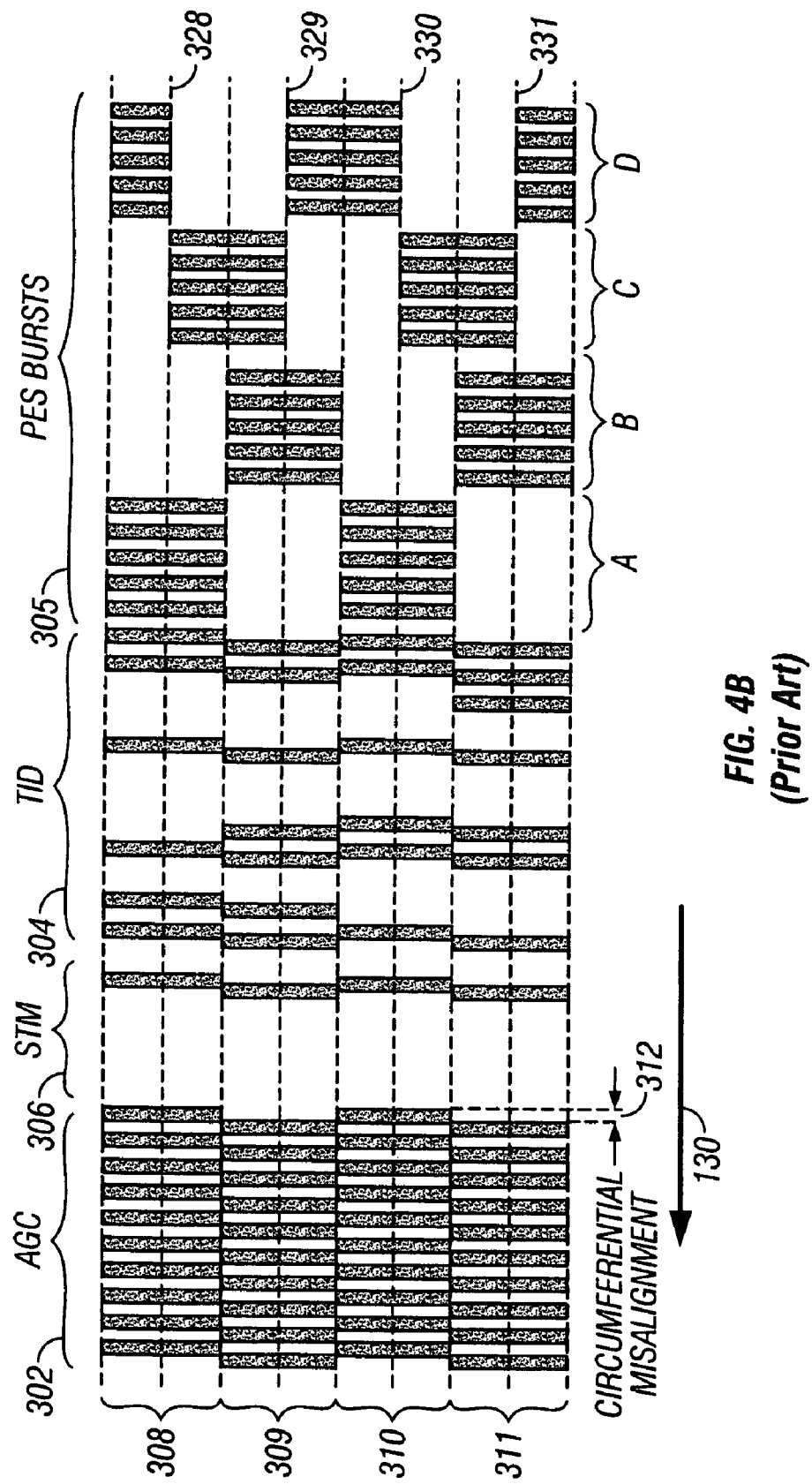
FIG. 4B shows the effect of circumferential misalignment on the prior art servo pattern in FIG. 4A.

The prior art servo pattern shown in FIG. 4A is written track-by-track, in half-track steps, with a regular write head. Alignment of each individual track with its neighbors is a key problem in writing the servo pattern. Two distinct alignment problems may occur. Track misregistration (TMR) occurs due to an error in the radial position of the head during servowriting. This translates to a repeatable error in the servo position information obtained from the servo pattern. Circumferential or along-track misalignment occurs due to an error in the circumferential position of the head during servowriting. Circumferential misalignment causes features which span more than one track to become irregular and distorted. FIG. 4B shows the effect of circumferential misalignment 312 on the servo pattern shown in FIG. 4A. In practice circumferential misalignment must be much smaller than the smallest circumferential feature in the servo pattern. As the recording density increases the servo pattern features become correspondingly smaller and circumferential misalignment becomes more of a problem.

The effect of circumferential misalignment is most pronounced where the head is reading significant contributions from features written on different tracks. For example, as shown in FIG. 4B, when the head is positioned mid-way between track centerline 328 and track centerline 329 the AGC field 302 contributions from the two tracks interfere destructively.

DESCRIPTION OF THE INVENTION

Figure 5A:
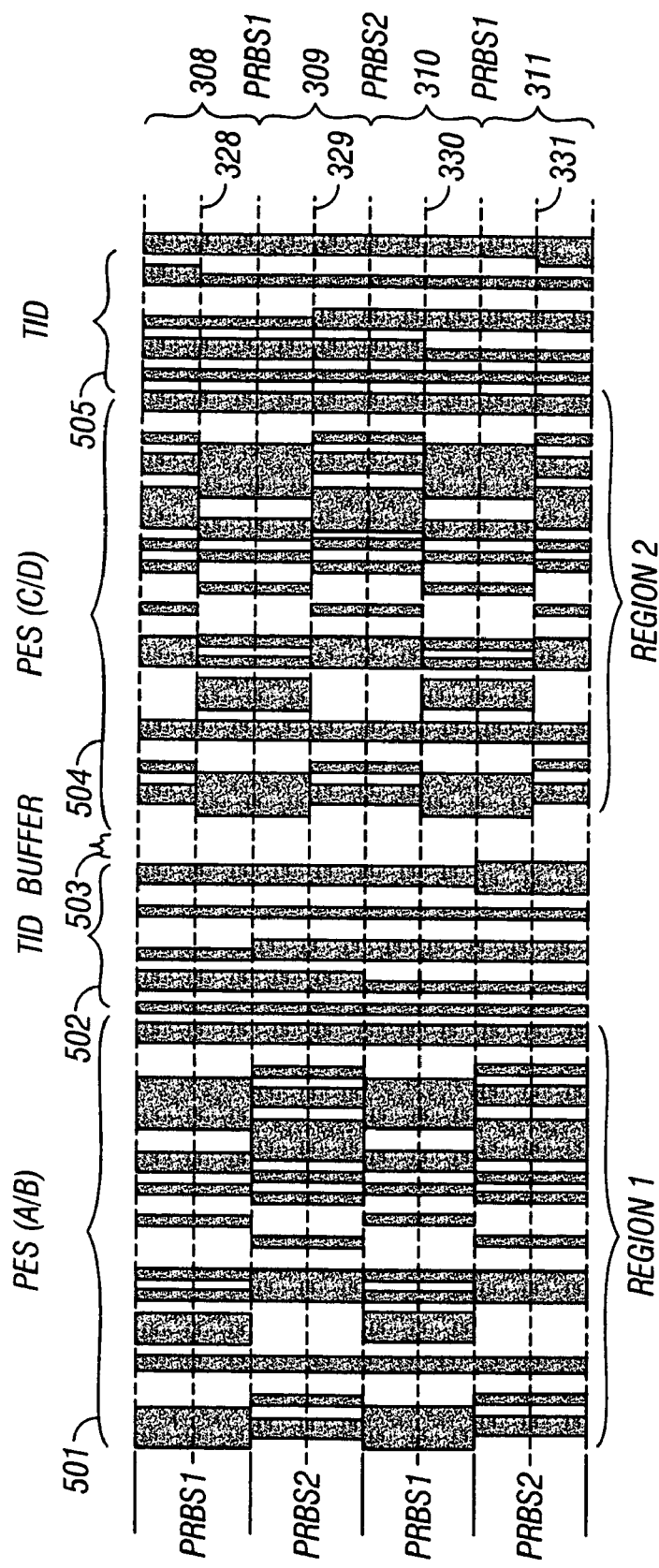
FIG. 5A is the servo pattern of the present invention.

The invention will be described with respect to a magnetic recording hard disk drive implementation, but the invention is applicable in general to data recording systems that have data recorded in adjacent data tracks that also include servo information for positioning the data recording head or transducer. FIG. 5A shows the servo pattern of the present invention. The AGC, STM and PES fields in the prior art are replaced by a single pseudo-random binary sequence (PRBS) field. Two consecutive PRBS fields are shown. PRBS field 501 is located in a first region of the servo pattern and PRBS field 504 is located in a second region circumferentially-spaced along the track from the first region. In addition, the TID field is encoded twice using NRZ representation (502 and 505), which is more efficient than the prior art dibit recording. The first TID field 502 is located between the two PRBS fields 501, 504. The use of NRZ in place of the conventional Gray-code for the TID fields reduces the size of the duplicated TID field.

The duplication of the TID field provides an effective method for dealing with circumferential misalignment. Regardless of the radial position of the head as it moves relative to the servo pattern, one of the two TID fields must be read on-track, or nearly on-track because the head cannot be simultaneously off-track on both records by more than one-fourth of the track pitch. When the TID field is read on-track, circumferential misalignment has little effect since the head registers little contribution from neighboring tracks and it is of no consequence whether the data on neighboring tracks are properly registered with the current track. The properties of the PRBS field permit timing and gain to be recovered separately for each TID field by using the preceding PRBS field.

A PRBS is a specific type of pseudo-noise (PN) sequence having very good autocorrelation properties, making it a good choice for the described embodiment. A PN sequence is any sequence with approximately noise-like autocorrelation properties suitable for detection by correlation filters.

The properties of a PRBS, the method of generating a PRBS, and the concept of correlation are well-known and described extensively in the technical literature, for example see MacWilliams and Sloane, *Proceedings of the IEEE*, VOL. 64, NO. 12, pp 1715–1729.

The correlation of two sequences a(t) and b(t) is defined as:

$$R_{a,b}(\tau) = \sum_t a(t)b(\tau+t)$$

This definition of correlation is well-known in the field of signal processing and is very similar to the statistical definition of correlation:

$$R_{a,b}(\tau) = E[a(t)b(\tau+t)] = \lim_{N \to \infty} \frac{1}{N} \sum_{t=0}^{N-1} a(t)b(\tau+t)$$

In both cases the quantity r is known as the "lag" between sequences a and b. The correlation sum given above is very similar to the convolution sum and it can be shown that the correlation of a(t) with b(t) is equal to the convolution of a(t) with b(−t). As a corollary of this, the correlation of an input sequence a(t) with a fixed reference sequence b(t) can be obtained using a filter with impulse response b(−t). A filter of this sort is referred to as a correlator matched to sequence b(t).

A pseudo-random binary sequence (PRBS), also called a maximal-length shift-register sequence (M sequence), is a periodic sequence of binary bits with a number of interesting properties. In particular, the autocorrelation function of an N-bit PRBS, that is, the correlation of an N-bit PRBS pattern with itself, is 1 for zero lag and 1/N elsewhere, up to lag N (whereupon it repeats). This is the property that gives pseudo-random binary sequences their name since a sequence of purely random binary bits would have an autocorrelation 1 at zero lag and autocorrelation 0 elsewhere. A direct consequence of this property is that if a periodic PRBS is input to a correlator matched to a single period of the same PRBS, the correlator will output a single narrow pulse each time the PRBS repeats. If a periodic PRBS is recorded using a magnetic recording system and the resulting read-back signal input to a matched correlator the correlator will output the dipulse response of the magnetic recording system each time the PRBS repeats. For a finite-length (i.e., not repeating indefinitely) PRBS the correlator output will be valid after one full period has been input to the correlator, and will remain valid until the last sample of the PRBS has been input to the correlator. The correlator is matched in the sense that the impulse response of the filter h[k] is equal to one period of the time-reversed PRBS, that is $$h[k]=x[n--]k=0, 1, \ldots n-1.$$

A consequence of the autocorrelation property of pseudo-random sequences is that when a PRBS is input to a matched correlator, the output is either 1 or −1/n.

Figure 12:
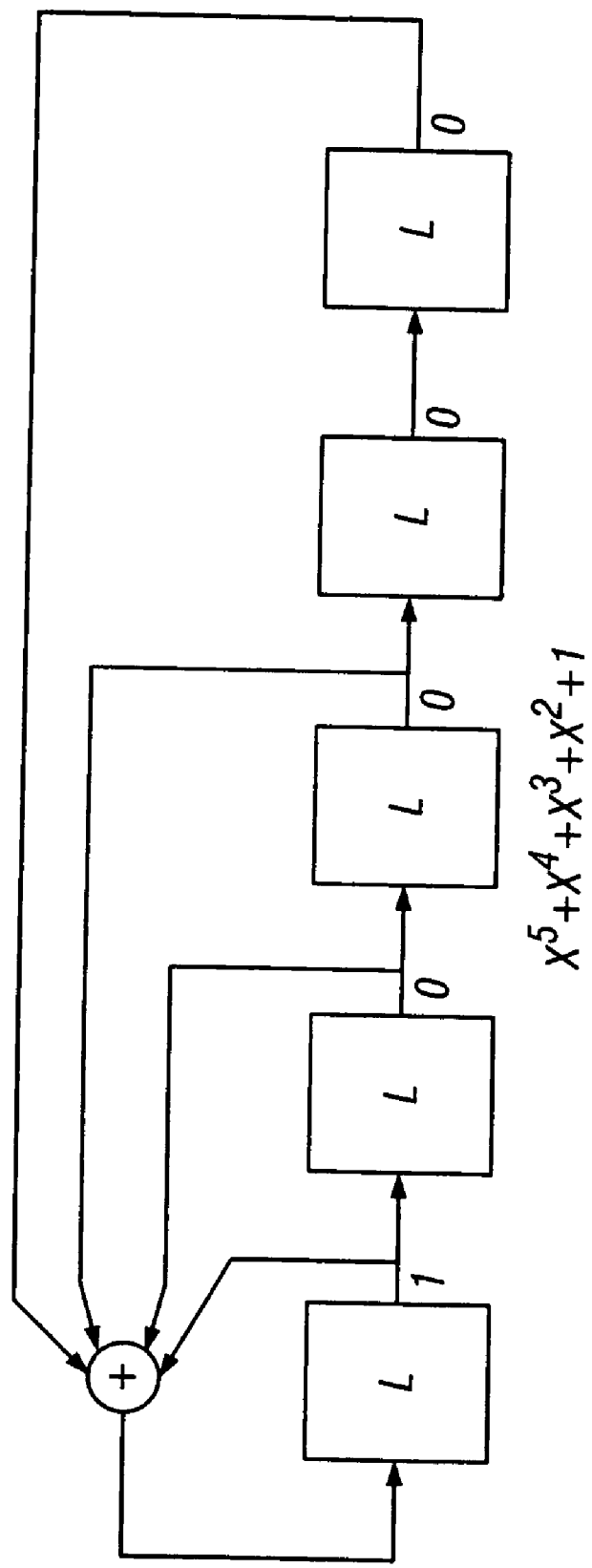
FIG. 12 is a diagram of a linear feed-back shift register (LFSR) commonly used to generate a PRBS.

A PRBS can be generated using a linear feedback shift register in which the feedback polynomial is primitive. A PRBS is typically $2^n-1$ bits long where n is an integer. FIG. 12 is an example of a LFSR with 5 latches that implement a $5^{th}$ order polynomial used to generate a 31-bit PRBS. For a $5^{th}$ order polynomial there exist 6 primitive polynomials that will produce a PRBS. In the preferred embodiment described here two PRBS are used. The two sequences are formed by taking a PRBS and the same PRBS cyclically shifted by a portion of its period, preferably approximately one-half its period. This cyclic shift means that when the original sequence is input to the correlator matched to the shifted sequence there will be no output over a window with width equal to approximately half the sequence length, and vice versa. Over this range of lag values the two sequences are said to be orthogonal. One sequence (PRBS1) is referred to as the A/C sequence because it encodes both the A-burst and C-burst PES. The other sequence (PRBS2) is referred to as the B/D sequence because it encodes both the B-burst and D-burst PES. In FIG. 5A, a 63-bit PRBS is used, with PRBS2 being shifted by 31 bits from PRBS1. Any portion of the PRBS period may be used to shift PRBS2 from PRBS1, but preferably the shift is approximately one-half the period, or approximately 25 to 35 bits if a 63-bit PRBS is used.

In FIG. 5A, PRBS1 is located between the track boundaries (alternate tracks 308 and 310) in the first region and encodes the A-burst, and is located between the track centerlines (centerlines 328, 329 and 330, 331) in the second region and encodes the C-burst. Similarly, PRBS2 is located between the track boundaries (alternate tracks 309 and 311) in the first region and encodes the B-burst, and is located between the track centerlines (centerlines 329, 330) in the second region and encodes the D-burst.

Figure 5B:
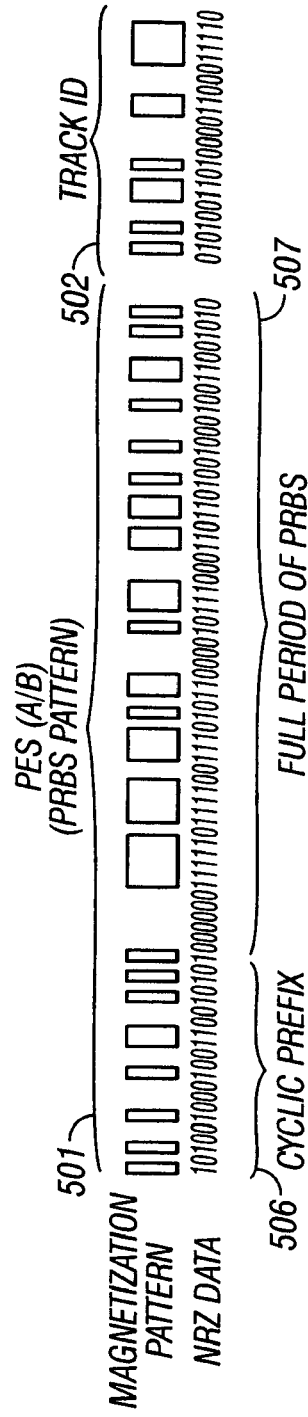
FIG. 5B is a pseudo-random binary sequence (PRBS) for the servo pattern in FIG. 5A.

One complete period of the PRBS field is recorded with a cyclic prefix comprised of part of another period of the pattern so that a total of approximately 1.3 periods of the PRBS are recorded, as shown in FIG. 5B. The output of each correlator is valid for the length of the cyclic prefix. The longer the cyclic prefix, the longer the output of the correlator remains valid. If the cyclic prefix were not present the output of the correlator would be valid only for a single fleeting instant in time.

Figure 6:
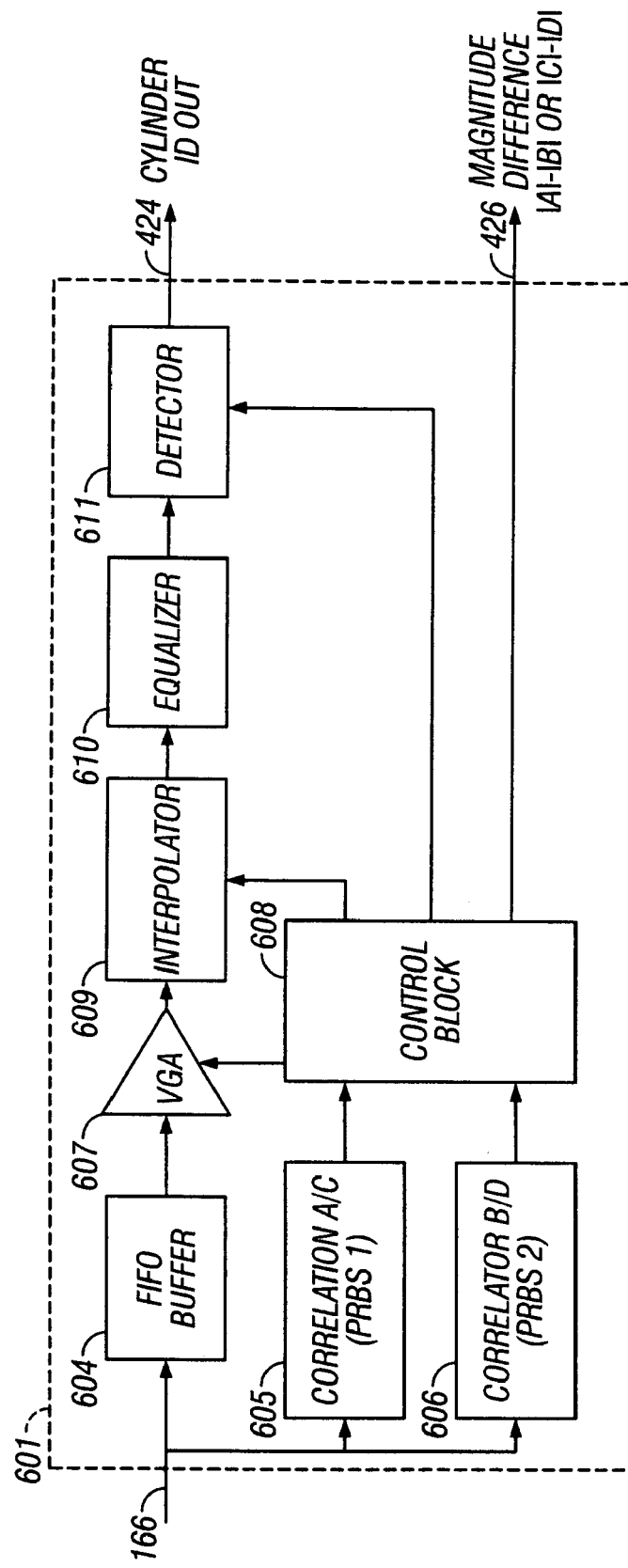
FIG. 6 is a block diagram of the servo decoder of the present invention.
Figure 7:
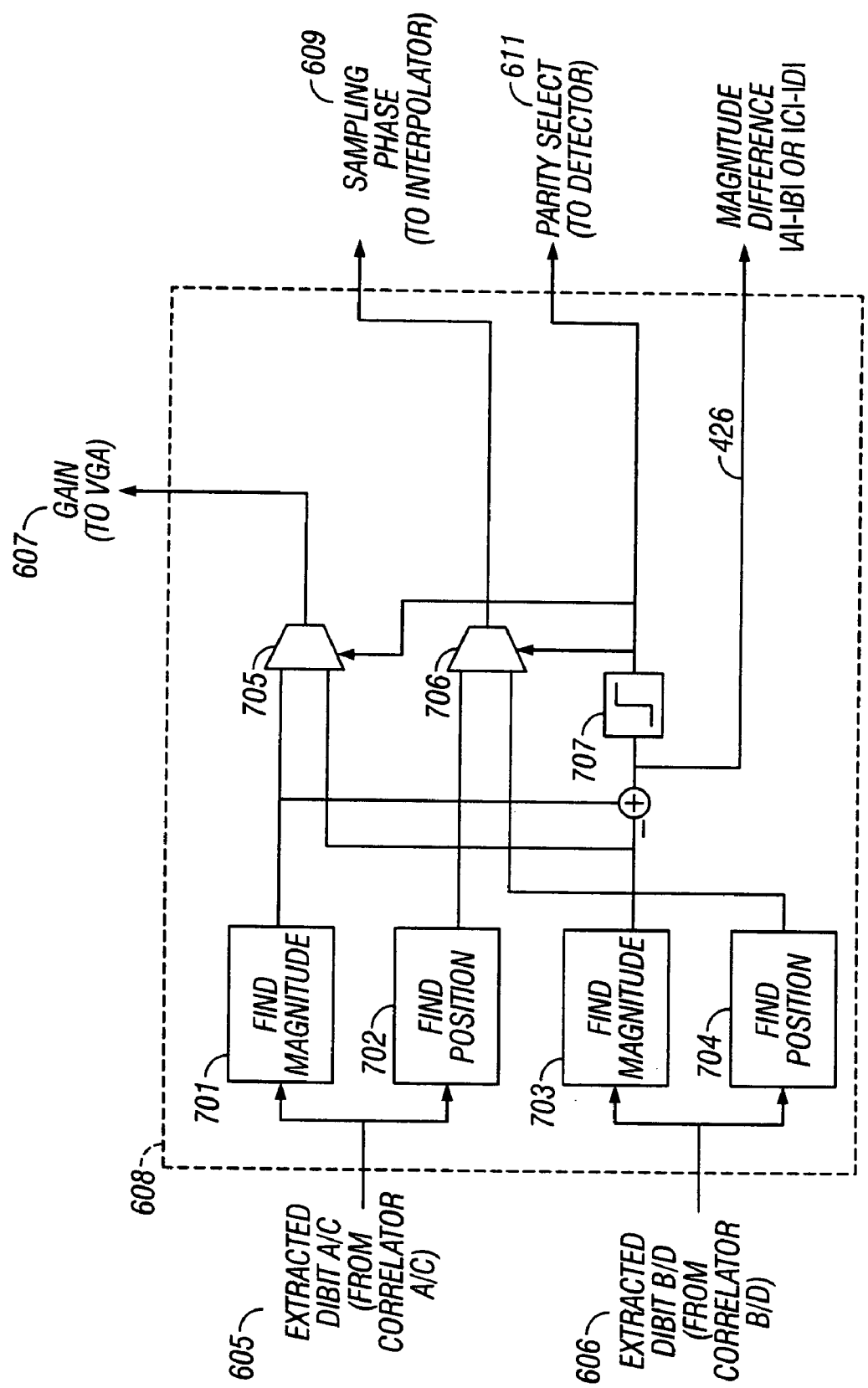
FIG. 7 is a detailed block diagram of control block 608 in the servo decoder in FIG. 6.

FIGS. 6 and 7 show the servo decoding system of the invention. FIG. 6 is a block diagram of the servo decoder 601 that replaces the prior art STM decoder 400, TID decoder 402 and PES decoder 403 (FIG. 3). Decoder 601 includes a PRBS1 correlator 605 and a PRBS2 correlator 606. The outputs of the correlators are directed to a control block 608. FIG. 7 is a detailed block diagram of control block 608.

The decoding is applied twice: once for PRBS field 501 and the first Track ID field 502 and once for PRBS 504 and the second Track ID field 505. The PRBS field 501 and TID field 502 are radially offset by one-half track pitch from PRBS field 504 and TID field 505.

The read-back signal is input to correlators 605 and 606. Correlator A/C 605 is matched to PRBS1 for PES A bursts in region 1 and PES C bursts in region 2, while correlator B/D 606 is matched to PRBS2 for PES B bursts in region 1 and PES D bursts in region 2.

Figure 8:
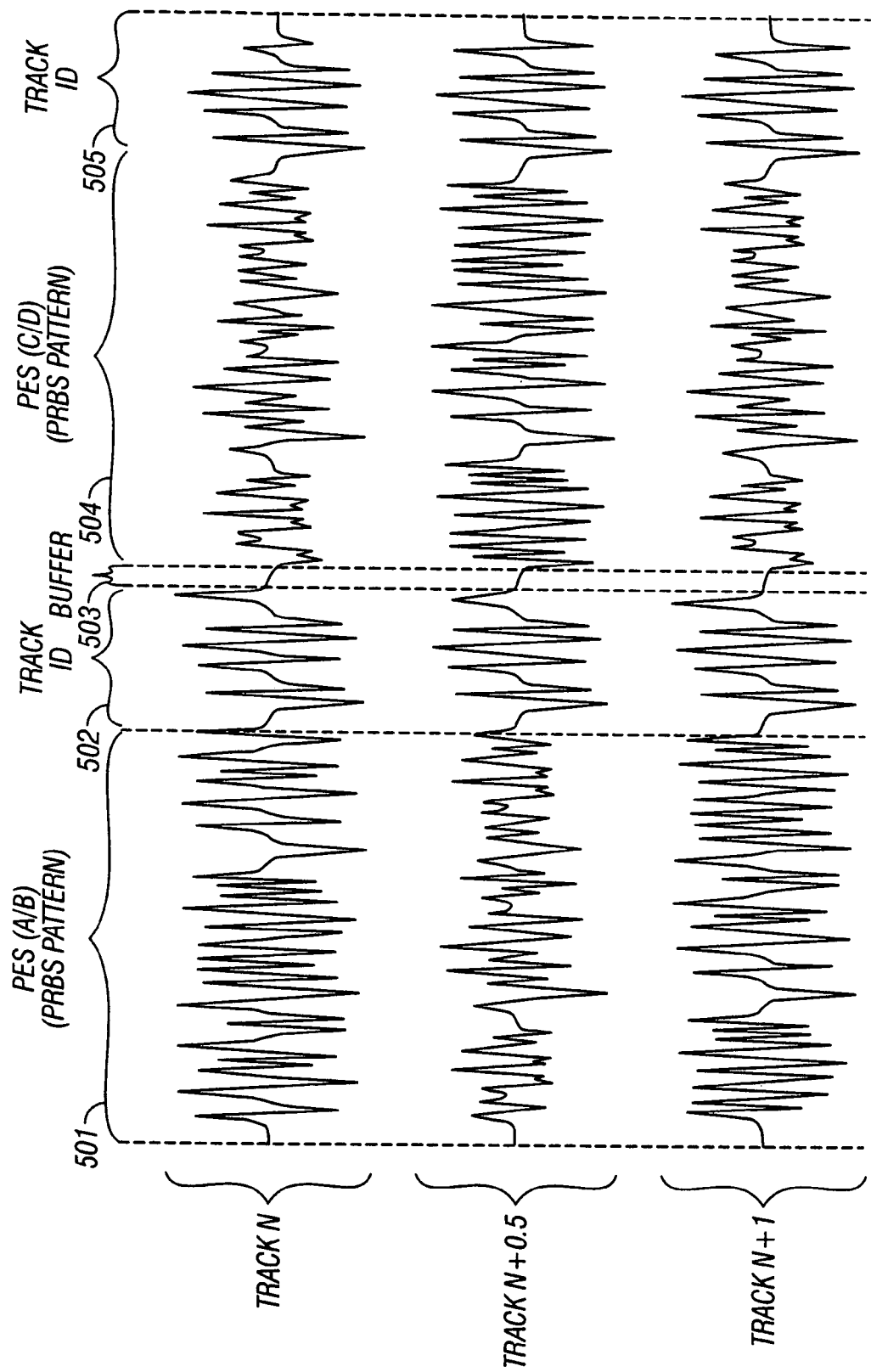
FIG. 8 shows typical read-back signals as the head moves from track N to adjacent track N+1 across the servo pattern of the present invention.
Figure 9:
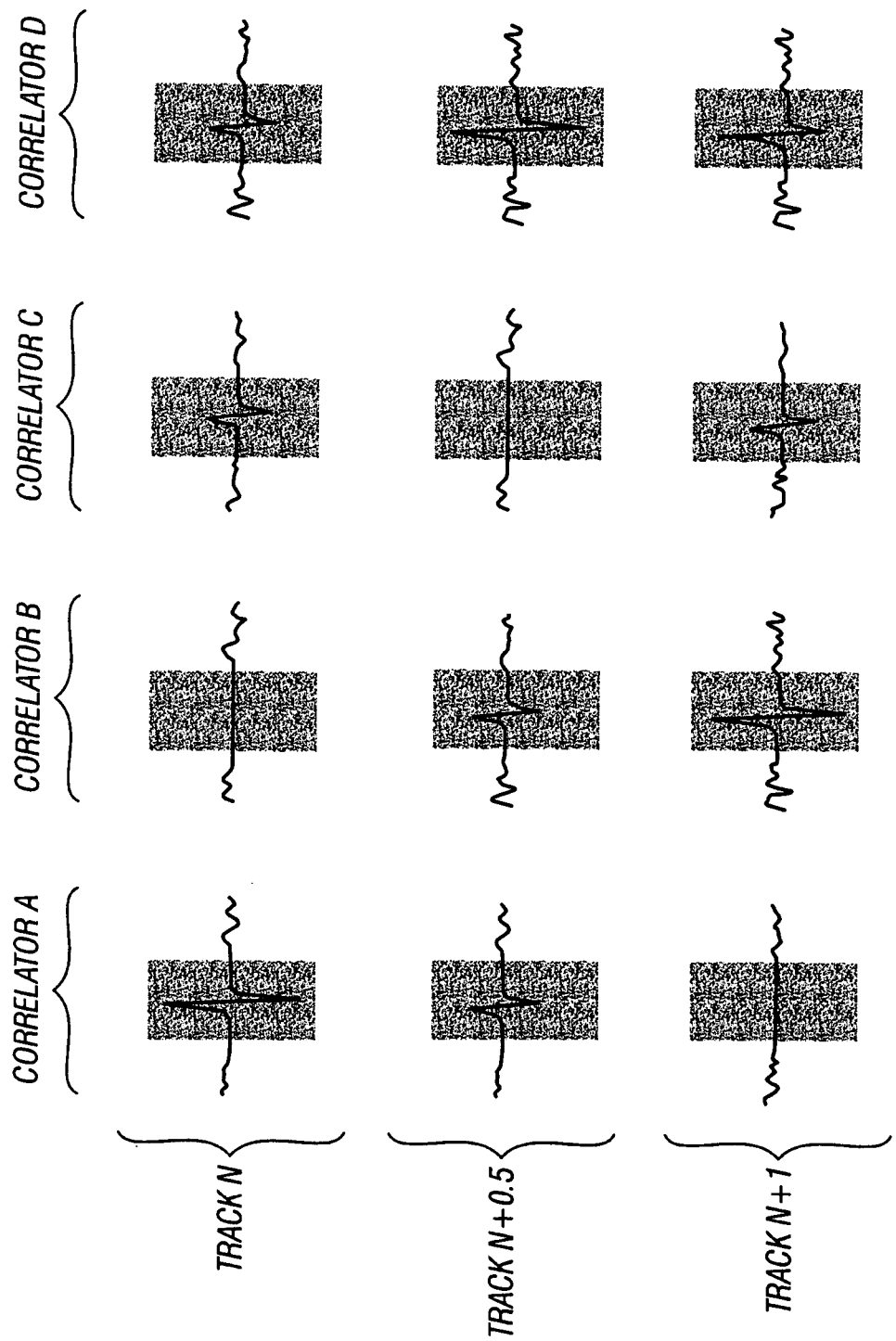
FIG. 9 shows the outputs of the correlators corresponding to the read-back signals of FIG. 8.

FIG. 8 shows typical read-back signals which might be read by the head as the head moves from track N to adjacent track N+1. FIG. 9 shows the corresponding dipulse signal outputs of the correlators 605, 606. As described previously, correlator blocks 605 and 606 are each applied once to PRBS field 501 and then to PRBS field 504 as the servo pattern moves under the head in the direction 130 (FIG. 5A). The first and second columns shown in FIG. 9, labeled Correlator A and Correlator B, show the output of correlator blocks 605 and 606, respectively, when the signal from PRBS field 501 is input. The third and fourth columns shown in FIG. 9, labeled Correlator C and Correlator D, show the output of correlator blocks 605 and 606, respectively, when the signal from PRBS field 504 is input. The size of the peaks of the dipulse output signals from each correlator yield the same position error signal information that would be obtained from the quad-burst fields in the prior art. With the head positioned directly above Track N, Correlator A produces a strong output, Correlator B produces no output and Correlators C and D produce small and equal outputs. As the head moves from Track N to Track N+1 the output from Correlators A and C decreases while the output from Correlators B and D increases. With the head positioned midway between Track N and Track N+1 (Track N+0.5) the outputs from Correlators A and B are equal and small, Correlator C produces no output and Correlator D produces a strong output. As the head continues to move, the output from Correlators A and D decreases while the output from Correlators B and C increases. With the head positioned directly above Track N+1, Correlator A produces no output, Correlator B produces a strong output and Correlators C and D again produce small and equal outputs. In the preferred embodiment the magnitude of the output (the amplitude of the dipulse signal) from each correlator is measured as the sum of the absolute values of the correlator outputs within a specified time window. This operation is performed by blocks 701 and 703 in FIG. 7. The difference between the magnitudes of the two correlator output signals (the difference between the outputs of blocks 701 and 703) is output to the servo controller for computing the position error signal on signal line 426.

Figure 10:
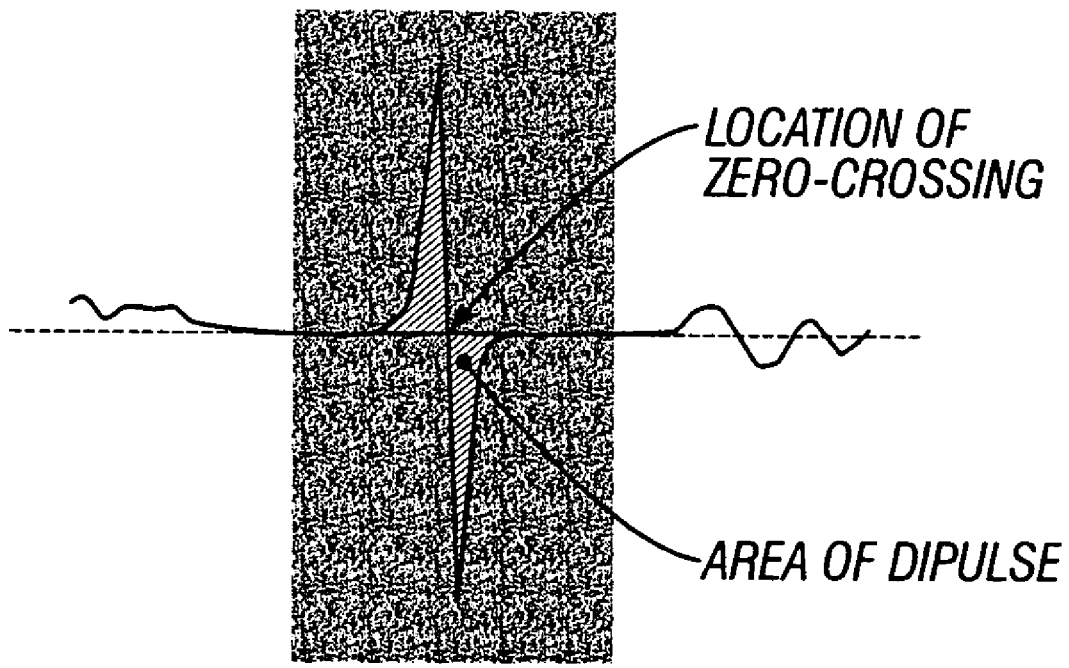
FIG. 10 is a typical dipulse output signal from a correlator.

FIG. 10 shows a typical output from blocks 701 and 703. The area of the dipulse is proportional to the amplitude of the signal read by the head from the recorded PRBS. The location of the dipulse zero-crossing indicates the circumferential position of the recorded PRBS. As will be explained, the information in the correlator dipulse output yields position error signal (PES) information and is also used to set the timing and gain for TID detection.

Referring again to FIGS. 6 and 7, the operation of the servo decoder to enable timing and gain for detection of the TID will be explained. Because a TID field is written at the same radial position as each PRBS field (TID field 502 between the track boundaries in region 1 and TID field 505 between the track centerlines in region 2 in FIG. 5A) the magnitude of the correlator outputs provides gain control information to assist in the detection of the TID fields.

The correlator with the larger magnitude is chosen by decision block 707 and the magnitude selected by multiplexer 705. This magnitude is used to control variable gain amplifier (VGA) 607.

The correlator output chosen by decision block 707 is also used to set parity for TID detector 611. If the servo decoder 601 detects dipulses of roughly equal amplitude at the output of each correlator 605, 606 then the TID detector 611 is disabled because the head is straddling two tracks on this record and reliable TID detection is not possible. The parity constraint improves TID detector reliability by eliminating single-bit errors. A parity constraint is applied by observing that in a Gray-coded pattern a single bit changes from track to track. Thus the TID parity is alternately even and odd. Further, the TID parity flips from even to odd and back as the PRBS field changes from (A/C) to (B/D) and back. Thus if Correlator A/C 605 produces a strong dipulse even parity is enforced on the TID, and if Correlator B/D 606 produces a strong dipulse odd parity is enforced on the TID.

The correlator outputs also provide timing information to assist in the reliable detection of the TID. The location of the peaks in the correlator outputs shift according to the position of the corresponding PRBS field. Because each TID field is written together with a PRBS field this position information is used to provide appropriate timing information for decoding the TID. In the preferred embodiment the position of the output from each correlator is measured as the location of the zero-crossing of the correlator dipulse signal (FIG. 10). This operation is performed by blocks 702 and 704 in FIG. 7. This zero-crossing timing information for the stronger correlator output is selected by multiplexer 706 and is used to control sampling interpolator 609.

Figure 11:
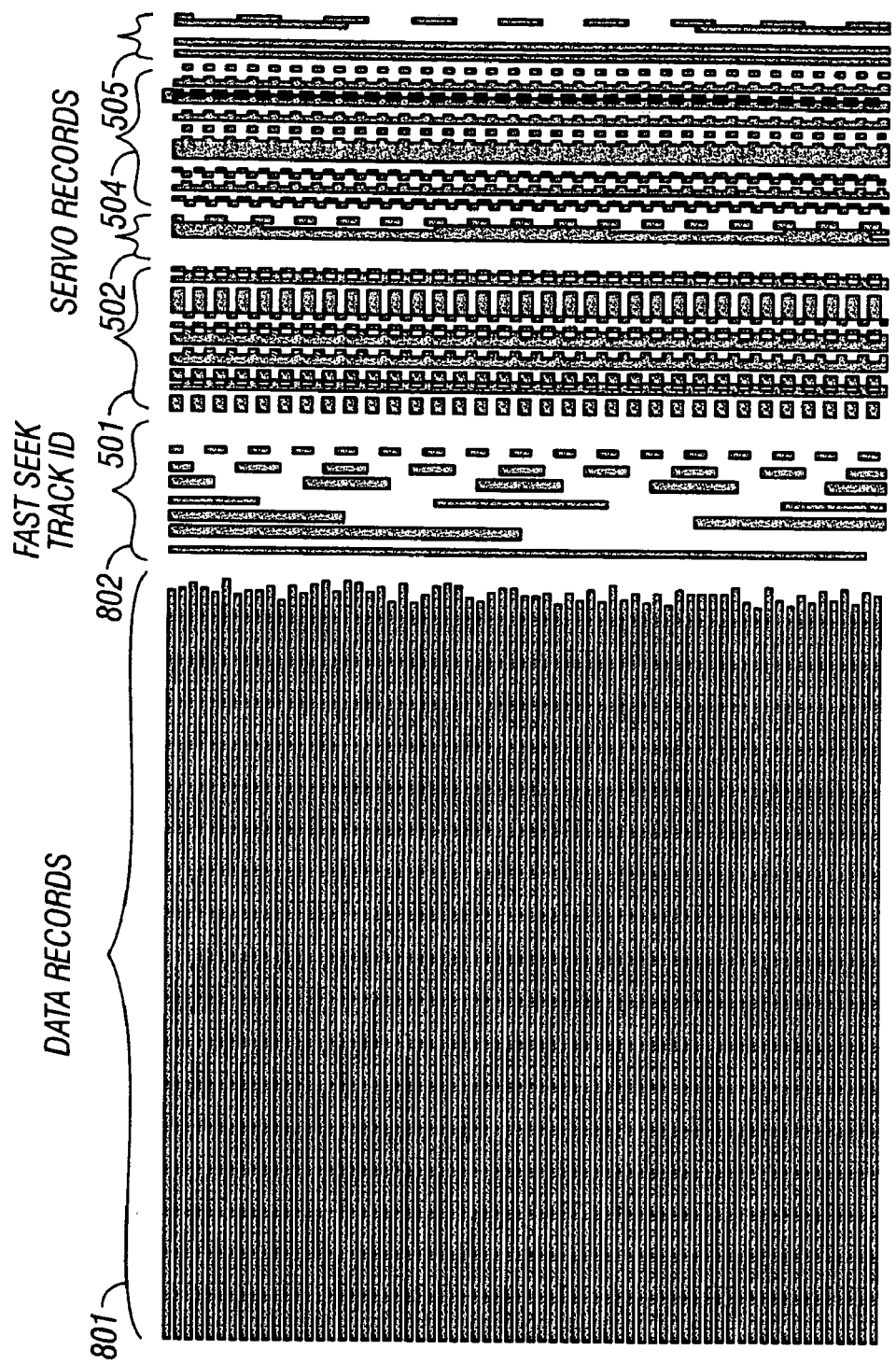
FIG. 11 shows a specialized fast-seek track identification (TID) field preceding the servo pattern of FIG. 5A.

When the servo system is in tracking mode or seeking at low velocity, the radial position of the head is essentially constant as the head passes over the entire servo pattern. This guarantees that the timing and gain information extracted from the PRBS fields 501 and 504 can be applied correctly for the subsequent TID fields 502 and 505. When the servo system is seeking at high velocity, the head will traverse many tracks as it crosses the servo pattern. In this case the servo decoder 601 may fail because the head may read the PRBS field 501 from one track and the TID field 504 from a different track. Thus the timing and gain information extracted from the PRBS field will not be relevant to the TID field. To overcome this limitation a specialized fast-seek TID field can be servowritten immediately prior to the main servo pattern, as shown by special TID field 802 in FIG. 11. This region of the disk is not usable because it is a time gap required for "write-to-read recovery" and is a result of the circumferential offset between the read head and write head. As a result additional disk real estate is not taken up by TID field 802. This fast-seek TID field 802 is written at low density and only encodes 5 or 6 bits of cylinder address.

As mentioned, the invention is not limited to magnetic recording hard disk drives, but is generally applicable to data recording systems that have data recorded in adjacent data tracks that also include servo information for positioning the data recording head or transducer. These systems include magnetic tape recording systems and optical disk recording systems.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A recording system comprising:
   a recording medium having a plurality of adjacent data tracks, each track having servo sectors, the servo sectors in each track being aligned along the track with servo sectors in adjacent tracks; wherein the servo sectors in the tracks form a servo pattern comprising (a) a first pseudo-random binary sequence (PRBS) of servo position information; (b) a second PRBS of servo position information, the second PRBS being identical to the first PRBS but shifted by a portion of the period of the first PRBS, the first PRBS and second PRBS each being located between the track boundaries in alternating tracks in a first region and between the track centers in alternating tracks in a second region spaced along the track from said first region; and (c) two track identification (TID) fields for each track, one of the TID fields for each track being located between the first and second regions;
   a head that reads the servo sectors;
   an actuator connected to the head for positioning the head to different tracks and maintaining the head on the tracks; and
   a decoder for generating a head position signal to the actuator in response to the first PRBS and second PRBS read by the head.

2. The system of claim 1 wherein the second PRBS is shifted by approximately one-half the period of the first PRBS.

3. The system of claim 1 wherein the recording system is a magnetic recording system and wherein the recording medium is a magnetic recording medium.

4. The system of claim 3 wherein the decoder further comprises a first correlator that generates a dipulse if the first PRBS has been read by the head and a second correlator that generates a dipulse if the second PRBS has been read by the head.

5. The system of claim 4 wherein the decoder generates the head position signal in response to the difference in amplitude of the dipulses from the first and second correlators.

6. The system of claim 4 wherein the system includes a variable gain amplifier coupled to the head for amplifying the signal read by the head, the amplifier being coupled to the correlators and responsive to the correlator dipulse having the larger amplitude.

7. The system of claim 4 wherein the decoder includes a TID detector responsive to TID fields read by the head, wherein the TID detector is coupled to the correlators, and wherein the correlator dipulse having the larger amplitude controls the timing of the TID detector.

8. A magnetic recording disk drive comprising:
  a rotatable magnetic recording disk having a plurality of concentric circular data tracks having generally circumferentially and-radially-aligned servo sectors, wherein servo sectors in radially-adjacent tracks form a servo pattern comprising (a) a first pseudo-random binary sequence (PRBS) of bursts of magnetic transitions; (b) a second PRBS of bursts of magnetic transitions, the second PRBS being identical to the first PRBS but shifted by approximately one-half the period of the first PRBS, the first PRBS and second PRBS each being located between the track boundaries in alternating tracks in a first region and between the track centers in alternating tracks in a second region circumferentially-spaced from said first region; and (c) two track identification (TID) fields for each track, one of the TID fields for each track being located between the first and second regions;
  a head that reads the servo sectors;
  an actuator connected to the head for positioning the head to different tracks and maintaining the head on the tracks; and
  a decoder for generating a head position signal to the actuator in response to the first PRBS and second PRBS read by the head.

9. The disk drive of claim 8 wherein the decoder further comprises a first correlator that generates a dipulse if the first PRBS has been read by the head and a second correlator that generates a dipulse if the second PRBS has been read by the head.

10. The disk drive of claim 9 wherein the decoder generates the head position signal in response to the difference in amplitude of the dipulses from the first and second correlators.

11. The disk drive of claim 9 wherein the disk drive includes a variable gain amplifier coupled to the head for amplifying the signal read by the head, the amplifier being coupled to the correlators and responsive to the correlator dipulse having the larger amplitude.

12. The disk drive of claim 9 wherein the decoder includes a TID detector responsive to TID fields read by the head, wherein the TID detector is coupled to the correlators, and wherein the correlator dipulse having the larger amplitude controls the timing of the TID detector.

* * * * *

UNITED STATES PATENT AND TRADEMARK OFFICE
CERTIFICATE OF CORRECTION

PATENT NO.     : 6,967,808 B1
DATED          : November 22, 2005
INVENTOR(S)    : Zvonimir Z. Bandic, Richard M.H. New and Bruce Alexander Wilson It is certified that error appears in the above-identified patent and that said Letters Patent is hereby corrected as shown below:

<u>Column 1,</u>
Line 13, before "having cliams directed to a data recording medium.", insert
-- Application No. 10/845,813 --.

Signed and Sealed this

Thirty-first Day of January, 2006

JON W. DUDAS
*Director of the United States Patent and Trademark Office*